April 22, 1941.  J. B. POINDEXTER  2,239,569

DENTAL X-RAY FILM HOLDER

Filed Dec. 29, 1939

Inventor
James B. Poindexter
By Lloyd W. Patch
Attorney

Patented Apr. 22, 1941

2,239,569

UNITED STATES PATENT OFFICE 2,239,569

DENTAL X-RAY FILM HOLDER

James B. Poindexter, Huntington, W. Va.

Application December 29, 1939, Serial No. 311,668

6 Claims. (Cl. 250—76)

My invention relates to dental X-ray film holders, and particularly to a device and structure of this character intended and adapted to use and hold ordinary commercial types of dental X-ray films.

The primary object is to provide a film holder which will position and hold an X-ray film in such relation that the upper and the lower teeth can be X-rayed to show the interproximal surfaces and the aveolar ridge and occulsal two-thirds of the upper and lower teeth on the same film.

Another object is to so construct the holder that any regular or ordinary X-ray film can be used, and that the film is held parallel to the long axis of the teeth, thus avoiding distortion.

A further object is to provide a device with which the film is readily and easily handled and located, and which prevents bending or shifting of the film during exposure, thus insuring a more accurate radiograph.

Still another object is to provide a holder structure permitting ready and accurate placement of the film for exposing the posterior teeth or for exposing the anterior teeth, without the necessity of manual holding of the film or of the structure, and which holder indicates or shows the proper line or angle for X-ray exposure.

With the above and other objects in view, some of which will be hereinafter more fully set forth, and others of which are inherent in the construction and arrangement of the parts and the manner of use, my invention includes certain novel features of construction and combinations and arrangements of parts which will be hereinafter more fully set forth in connection with the drawing and then pointed out in the claims.

Figure 1:
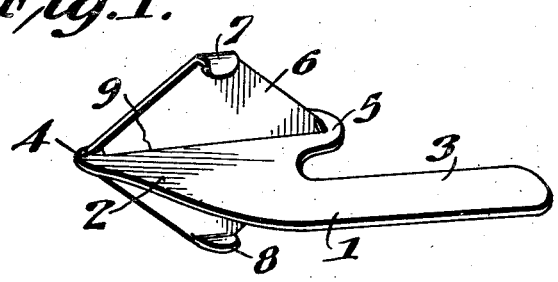
Figure 1 is a view in perspective showing a holder constructed in accordance with my invention.
Figure 2:
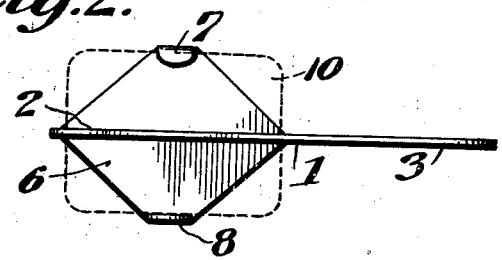
Fig. 2 is a view in elevation looking from the outer side.
Figure 3:
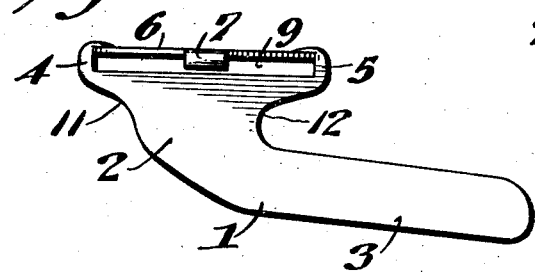
Fig. 3 illustrates the holder as it will appear when viewed in plan.

The form of holder illustrated in Figs. 1 through 4 is adapted to receive and hold an ordinary double X-ray film with its long dimension substantially horizontally, this being perhaps best adapted for use in obtaining an X-ray of posterior or back teeth. The body portion 1 consists of a bite portion 2 and a handle portion 3 extending outwardly therefrom, and perhaps laterally to either side.

The body portion 1 has extensions 4 and 5 at opposite ends of the bite portion 2, and a film supporting back member 6 is carried at the outer ends of these extensions 4 and 5 to thus be spaced from the bite portion 2 in its middle and to extend substantially at right angles to the bite portion 2. This supporting back member 6 is preferably cut away or reduced at its corners, and is provided at its upper and its lower edges with film retaining flange portions 7 and 8.

The space between the extensions 4 and 5 is left clear, substantially as a slot 9, for a sufficient length to permit placement and removal of an ordinary X-ray film, the flange portion 7 and hook 8 engaging the upper and lower edges of the film to hold the film against vertical displacement, the extensions 4 and 5 holding against endwise displacement, and the edge of the bite portion 2 at the slot-like formation 9 serving to retain the film against forward displacement. One or both of the flange portions 7 and 8 can be made somewhat hook-shaped, and as the X-ray film is slightly flexible it will readily yield to permit placement to be held on the face of the film supporting back member 6, adjacent to the bite portion 2, as illustrated in Fig. 4, and as indicated by the dotted lines in Fig. 2.

With a film holder constructed in accordance with my invention, an ordinary dental X-ray film can be readily fitted in place and can be removed with facility following exposure; and, by holding the device through the use of the handle portion 3, an operator can readily manipulate and place and locate the film at any desired position within the mouth, so that when the patient bites on the bite portion 2 the holder, and consequently the film, as indicated at 10, will be rigidly held in the desired location. To permit greater freedom of movement, it may be found desirable to reduce the width of the bite portion 2, at each end, as indicated at 11 and 12.

Figure 4:
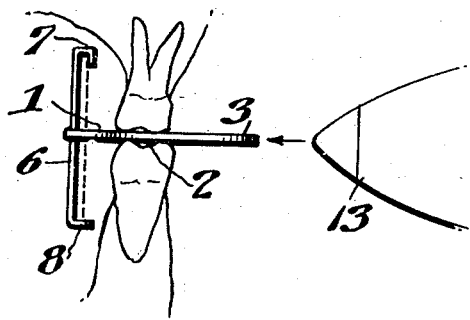
Fig. 4 is a view in end elevation of the holder, with the relative position of the teeth and of the setting of the X-ray tube somewhat schematically shown.

When the holder is fitted in the mouth and the bite portion 2 is held between the teeth, the outer extremity of the bite portion 2 extends from and is exposed between the lips so that this flat thin plate-like bite portion 2 can be employed as a guide and indicator to help angulation and thus permit rapid and accurate lining up of an X-ray apparatus to insure a radiograph taken at the proper angle, after the manner of the X-ray apparatus generally indicated at 13, in Fig. 4.

Figure 5:
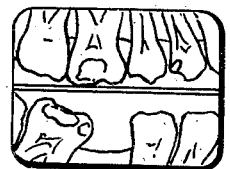
Fig. 5 is a view in elevation of a film showing a radiograph of posterior teeth.

With the use of my improved holder it is possible to obtain a finished X-ray film, of the type indicated at 14, in Fig. 5, clearly depicting the desired portions of the teeth, and with the line of the bite portion 2 clearly and accurately indicating the proper angulation of X-ray exposure and that the radiograph has been taken at a proper angle to avoid distortion. Further, as the film supporting back member 6 is rigid and inflexible, the X-ray film 10 is held against being bent or against otherwise being shifted or misplaced to cause distortion. With the back member 6 reduced or cut away at its corners, metal is not presented in manner to be likely to contact with and cause injury to the surfaces or tissues of the mouth or tongue.

Figure 6:
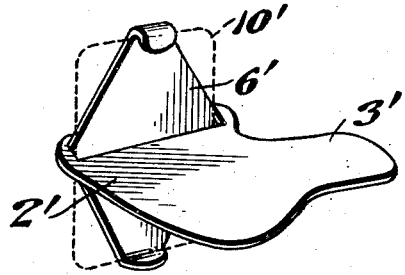
Fig. 6 is a perspective view showing a modified construction of the holder.

With the form of the device as shown in Fig. 6, the film supporting back 6' is disposed with its greater dimension extending vertically so that the film 10' can be correspondingly placed and held, and this form of holder is well adapted for exposing and obtaining a radiograph of the anterior teeth of a patient. The bite portion 2' and the handle portion 3' will serve substantially the same purpose and function as have been set forth above, and thus the film placed in this holder can be readily handled and manipulated to be located as desired within the mouth of a patient, and the forward extending edge of the bite portion 2 will serve as an angulation guide for location and placement of the X-ray apparatus.

Figure 7:
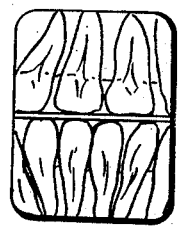
Fig. 7 is a view similar to Fig. 5 depicting anterior teeth.

In Fig. 7 I have illustrated a radiograph film depicting the front teeth, and it will be appreciated that the holder as illustrated in Fig. 6, with which this film is used, can be employed to produce a radiograph showing the central incisors and can be shifted to either right or left to show the laterals and the proximate cuspids.

It has been found possible to employ the holder illustrated in Figure 1 to obtain radiographs of the posterior teeth, and the holder of Fig. 6 for making radiographs of the anterior teeth, and obviously, each and either of these holders can be made of different sizes to thus permit use in mouths of different sizes. Where necessary, the holder as illustrated in Fig. 6 can be made in one width for exposing the anterior teeth of the average patient, and in a lesser width for exposing the anterior teeth of a patient with a narrow ridge, and variations in size and in the manner of use can be made to suit different patients and different requirements.

Presently, it is contemplated that the holder structure shall be made of German silver, stainless steel, or some other metal or material that will not tarnish or be affected by use, and which will permit ready cleaning and sterilization. However, it is possible that the holder can be molded or cast or otherwise formed of phenolic condensation products, or of other suitable materials. Where metal is employed, a line will appear upon the finished film between the upper and lower teeth, and this line indicates proper angulation; however, under some conditions it may be found desirable to avoid this blanking out of the space between the teeth, under which circumstances glass or other material penetrable by the X-ray might be employed in the construction of the device.

While I have herein shown and described only certain specific embodiments and have set forth only certain possible manners of use, it will be understood and appreciated that changes and variations can be made in the form, construction, arrangement, association and assembly of the parts, without departing from the spirit and scope of my invention.

I claim:

1. A dental X-ray film holder comprising, a substantially flat bite portion having extensions at its inner edge spaced to permit passage of an X-ray film, and a film supporting back member carried by said extensions substantially at right angles to the bite portion to back up a film received between the extensions and provided with portions to retain said film in place.

2. A dental X-ray film holder comprising, a body part having a bite portion adapted to be received and held between the upper and lower teeth, and a film supporting back member carried substantially at right angles to the bite portion with the bite portion slotted and thereby separated in the middle area from the said back member to permit insertion of an X-ray film through the slot with its end portions exposed above and below said bite portion.

3. A dental X-ray film holder comprising, a substantially flat bite portion, and a film supporting back member rigidly carried to be held substantially at right angles and within the mouth when the bite portion is held between upper and lower teeth, said bite portion having an opening therethrough to clear an X-ray film placed and held upon the back member.

4. A dental X-ray film holder comprising, a substantially flat body part having a bite portion to be held between the upper and lower teeth and provided with an outwardly disposed handle for manipulation and placement, said body portion having extensions at one edge spaced to permit passage of an X-ray film, a film supporting back member carried rigidly by said extensions substantially at right angles to the bite portion to back up a film received between the extensions, and portions on said back member to retain the film in place thereon.

5. A rigid dental X-ray film holder comprising a bite portion provided with a slot at its rear edge and a perpendicular film supporting back member behind said slot extending above and below said bite portion, film retaining means at the edges of said back member.

6. A rigid dental X-ray film holder comprising a bite portion provided with a slot at its rear edge and a perpendicular film supporting back member behind said slot extending above and below said bite portion, film retaining means at the edges of said back member, and a handle portion extending from and in substantially the plane of the bite portion and consequently exposed outside the mouth.

JAMES B. POINDEXTER.